(12) United States Patent
Fivelstad et al.

(10) Patent No.: US 6,229,690 B1
(45) Date of Patent: May 8, 2001

(54) ELECTRICAL SWITCHGEAR

(75) Inventors: Jan Fivelstad, Orkanger (NO); Christer Arnborg, Gävle (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/402,538

(22) PCT Filed: Apr. 3, 1998

(86) PCT No.: PCT/SE98/00620

§ 371 Date: Jan. 7, 2000

§ 102(e) Date: Jan. 7, 2000

(87) PCT Pub. No.: WO98/45912

PCT Pub. Date: Oct. 15, 1998

(30) Foreign Application Priority Data

Apr. 7, 1997 (SE) .................................................... 9701263

(51) Int. Cl.⁷ .................................................... H02B 5/00
(52) U.S. Cl. .................... 361/605; 361/600; 361/602; 361/611; 361/620; 361/676; 361/678; 218/75; 200/307; 174/50.4
(58) Field of Search .................. 361/605, 604, 361/611, 617, 681, 832, 831, 600–612, 624–627, 640–648, 675–678; 200/307, 50 A, 50 AA, 48 R, 48 V, 48 SB, 144 B, 145; 307/113, 147–150; 174/50.54, 72 B, 71 B, 106 SC, 35 GC, 35 MS, 35 C; 277/227–235

(56) References Cited

U.S. PATENT DOCUMENTS

| | | | | |
|---|---|---|---|---|
| 3,562,593 | * | 2/1971 | Bould .................................. | 317/103 |
| 4,202,028 | * | 5/1980 | Baird .................................. | 361/343 |
| 4,249,227 | * | 2/1981 | Kato et al. ........................... | 361/334 |
| 4,677,524 | * | 6/1987 | Shiraishi et al. ..................... | 361/335 |
| 5,124,881 | * | 6/1992 | Motoki ................................ | 361/335 |
| 5,245,506 | * | 9/1993 | Tanimizu ............................. | 361/605 |

FOREIGN PATENT DOCUMENTS

| | | |
|---|---|---|
| 467 537 | 2/1969 | (CH). |
| 1 540 176 | 1/1970 | (DE). |
| 28 24 623 | 12/1979 | (DE). |
| 32 15 236 | 11/1983 | (DE). |
| 43 12 621 | 10/1994 | (DE). |
| 0 054 265 | 6/1982 | (EP). |

* cited by examiner

Primary Examiner—Leo P. Picard
Assistant Examiner—Michael Datskovsky
(74) Attorney, Agent, or Firm—Connelly Bove Lodge & Hutz, LLP

(57) ABSTRACT

The invention concerns a horizontally divided switchgear, including compartments for high voltage and for cable connection. The cable connection compartment is common to one or more switchgear cubicles and is a compartment separated from the high voltage compartment(s) of the cubicle(s). In the switchgear is included one or more switchgear cubicles defined by vertical (12, 13, 14) and horizontal (15, 16) walls. The cubicle is arranged with only high voltage equipment, while connection means (18) for incoming and outgoing current cables are arranged exteriorly underneath the lower horizontal wall (16) of the cubicle. Bushing means (17) for cable conections are arranged in the lower horizontal wall (16).

2 Claims, 1 Drawing Sheet

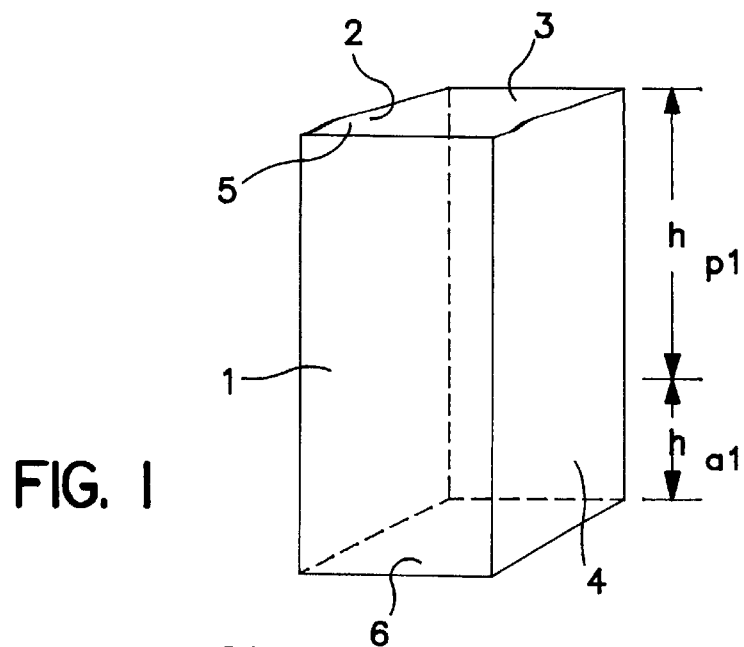
FIG. 1
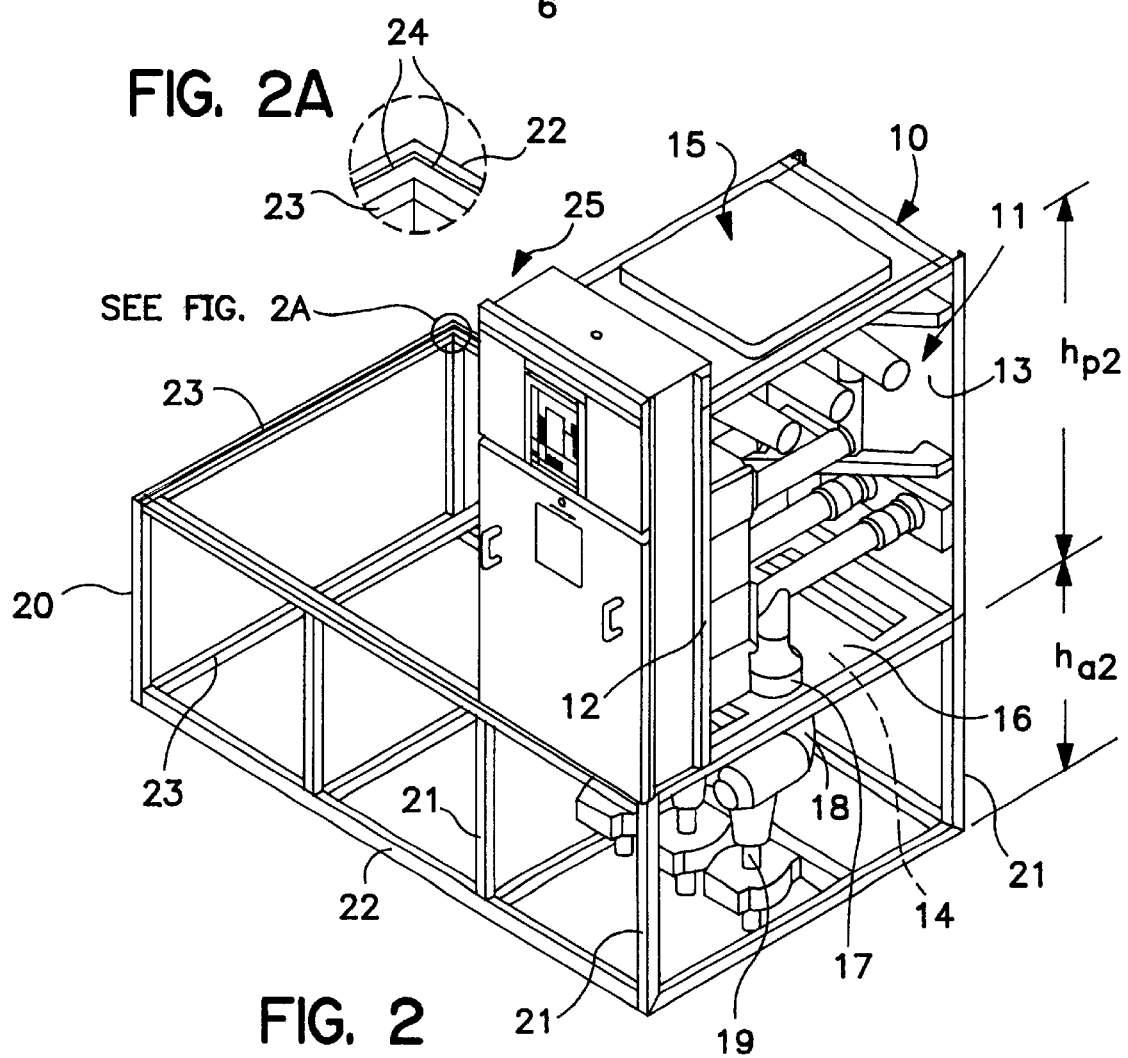
FIG. 2A
FIG. 2

ELECTRICAL SWITCHGEAR

The present invention concerns a switchgear, particularly for medium voltage, according to the preamble of claim 1. The invention also concerns a switchgear cubicle for use in such a switchgear.

A switchgear often comprises a plurality of switchgear cubicles. With switchgear cubicle is intended here a parallelepipedic space or room generally defined by two to four vertical and two horizontal walls, in which, in an upper portion, are mounted devices necessary for switching functions (current interruption, disconnecting and grounding) as well as measuring transformers etc., and a bar system for their interconnection, while connection of cables for incoming and outgoing current takes place in a lower portion. Thus, a complete switchgear cubicle has a certain height, defined by its fittings and its cable connection compartment.

Hitherto, switchgear cubicles have been factory completed and tested before delivery, in order to be placed directly on a switchgear flooring when being mounted in the premises of a customer. Before it has been possible to begin the very time consuming and complicated mounting of incoming and outgoing cables as well as wiring for control and surveillance systems etc., it has often been necessary to undertake adjustment of the substratum for the cubicle to stand completely horizontal. Due to the large weight of the cubicle, it has been necessary then to empty it from substantially all fittings in order to make it manageable at all. This, of course, has involved an extra cost apart from the capital cost involved in having a complete switchboard cubicle standing unused during the long duration of an installation.

It would be desirable, thus, to rationalise the manufacturing, delivery and assembly process, such that the largest possible savings in costs as well as time can be reached, and such that work, that must anyhow be performed in connection with the installation, becomes as simple and physically light as possible.

According to the present invention it is proposed, therefore, that the lower portion of a switchgear cubicle, in which connection of incoming and outgoing cables takes place, is simply removed, such that the cubicle downwardly terminates at a higher level than before. This means that connection of incoming and outgoing cables no longer takes place within the cubicle, but outside and beneath it. This, in turn, results in that bushing means for power cable connection are arranged in the now raised bottom of the cabinet, that downwardly closes the cubicle.

The main characteristics of the invention appear from the characterising part of appended claim 1.

It is known in the art that cables asre located in a separate cell provided as a part of a switchgear cubicle, see for instance DE-43 12 621 A1. However, this separate cell is still a part of the switchgear cubicle.

The novel thinking presented by the present invention offers a row of advantages:

A substratum adapted to the cubicle can be arranged at the installation site independently of if the switchgear cubicle is delivered or not. Such a substratum may be a rack of the truss or framework kind, cantilevers protruding from a wall, or any other device keeping the cubicle at such height that connection of cables from below is possible.

Cables can be laid in advance up to the substratum and be provided with connection means fitting to connection means at the bottom of the new switchgear cubicle. Suitably, these connection means are single phase encapsulated, thus eliminating the risks of hazardous touch and electric arc. The use of connection means results in lower costs, safer and simpler assembly, and faster putting into service as soon as the cubicle has been located.

The switchgear cubicle can be factory completed during the time preparatory works at the installation site as stated above are in progress. It can be tested and delivered in a tested state, burt needs no more be dismantled at the mounting site since the substratum is prepared in advance and completely adapted to the cubicle delivered, which, thus, may be put in operation practically at once.

All high voltage parts included in the cubicle are gathered in an encapsulation so that they are inaccessible from outside. Advantageously, then, controls for connection apparatuses as well as a possible bay computer can be provided in a separate encapsulated space mounted in front of the one just mentioned.

When at least one cubicle of a row of cabinets is of a type lacking power cable connection, such cubicle may be used to accommodate a low voltage unit, e.g. a set of batteries with associated charger etc., that is suitably carried by a carriage which can be wheeled into the empty space. This is enabled owing to the space below the cubicle not being a high voltage space.

When a standardised rack is used as a substratum, several further advantages are offered:

It can suitably be sent to the installation site as a so-called flat package.

It is easy to adjust against the flooring.

It can be made in longer sections in order to support more than one cabinet.

The invention will now be more closely described, reference being made to the accompanying drawings, wherein FIG. 1 a perspective view of a conventionally arranged switchgear cubicle, presented in order to elucidate the difference between the state of art and the invention, and FIG. 2 is a perspective view of a switchgear cubicle according to the invention arranged on a substratum in the shape of a rack adapted to support three adjacent cubicles.

The switchgear cubicle according to the state of art schematically shown in FIG. 1 is constituted by a box-shaped sheet metal structure having four vertical walls 1, 2, 3 and 4, as well as an upper and a lower wall 5 and 6, respectively. When such a cubicle is an end cubicle of a row of similar cubicles, one vertical wall is omitted, e.g. the wall 2, while two vertical walls, e.g. 2 and 4, are omitted if the cubicle is located within a row of cubicles.

A cubicle of this kind is placed directly on a switchgear flooring resulting in the inconveniences referred to above.

Of the total height of the cubicle, as counted from above, a larger portion, here referred to as primary part, is occupied by high voltage devices. The part height necessary for this is designated in FIG. 1 with $h_{p1}$. The remaining, lower portion of the cabinet, here referred to as connection part, is utilised for connecting power cables for incoming and outgoing current. Its height is designated $h_{a1}$.

As is shown in FIG. 2, in a switchgear cubicle according to the present invention, all high voltage components are gathered in a common, all around closed compartment 11. As before, this compartment is restricted by four vertical walls if the cubicle is the only one of an installation, which in unusual, and two horizontal walls. In the example shown, concerning an installation comprising three cubicles, of which the cubicle shown is erected in one end of the row of cubicles, there are, thus, only three vertical walls 12, 13 and 14 (of which the wall 14, in the Figure, has been removed in order to shown the inner compartment 11) and two horizontal walls 15 and 16. Since the cubicle accommodates only the so-called primary part (substantially all electrical functions for a primary circuit with auxiliary circuits) its height can be limited to $h_{p2}$.

The wall 16, constituting the downward closure of the cubicle, exhibits bushing means 17 for cable connection for incoming or outgoing current. Since a switchgear cubicle according to the invention is not intended to be put directly on a flooring, but to rest on a separate substratum spaced from the flooring, connection means 18 can be fixedly mounted underneath the cubicle already at the factory, and, in connection with the installation, these means may be simply connected to corresponding connection means 19 on the incoming and outgoing cable, respectively. In order to enable this connection, the cubicle must have a height $h_{a2}$ above the flooring.

In the example shown in FIG. 2, the substratum of the cubicle comprises a rack 20, that may be composed of suitable vertical and horizontal bars 21 and 22, 23, respectively, the height $h_{a2}$ being provided by the vertical bars 21. The bars are suitably profiled sections, and grooves 24 may be provided in order to guide horizontal displacement movements of the cubicle on the rack.

A separate control cubicle 25 is mounted onto the wall 12.

What is claimed is:

1. A switchgear, including at least two switchgear cubicles supported at a defined height from a flooring by a separate cable connection compartment, wherein each of said switchgear cubicles is provided with a connection means for incoming and outgoing current cables fixedly mounted in a lower horizontal wall of said cubicle and protruding downwardly from said cubicle so as to be connectable to power cables within said cable connection compartment, said cable connection compartment being common to said at least two switchgear cubicles and comprising a set of vertical and horizontal bar members, said vertical bar members defining said defined height.

2. A method of erecting a switchgear, including the steps of interconnecting vertical and horizontal bar members of a set of bar members to form a cable connection compartment for supporting at least two switchgear cubicles at a defined height above a flooring, laying out power cables to and from said cable connection compartment, placing said at least two switchgear cubicles on said cable connection compartment, and connecting said cables to said at least two switchgear cubicles within said connection compartment.

* * * * *